United States Patent
Stone et al.

(10) Patent No.: US 10,247,111 B2
(45) Date of Patent: Apr. 2, 2019

(54) VALVE CONTROL SYSTEMS FOR INTERNAL COMBUSTION ENGINES AND METHODS OF OPERATION THEREOF

(71) Applicant: Camcon Auto Limited, Cambridgeshire (GB)

(72) Inventors: Roger Derrick Stone, East Sussex (GB); Richard James Tyrrell, West Sussex (GB)

(73) Assignee: Camcon Auto Limited, Cambridgeshire (GB)

( * ) Notice: Subject to any disclaimer, the term of this patent is extended or adjusted under 35 U.S.C. 154(b) by 5 days.

(21) Appl. No.: 14/430,785

(22) PCT Filed: Sep. 23, 2013

(86) PCT No.: PCT/GB2013/052486
§ 371 (c)(1),
(2) Date: Mar. 24, 2015

(87) PCT Pub. No.: WO2014/049339
PCT Pub. Date: Apr. 3, 2014

(65) Prior Publication Data
US 2015/0233307 A1    Aug. 20, 2015

(30) Foreign Application Priority Data

Sep. 25, 2012 (GB) .................................. 1217095.7

(51) Int. Cl.
*F02D 13/02* (2006.01)
*F01L 1/26* (2006.01)
(Continued)

(52) U.S. Cl.
CPC .......... *F02D 13/0257* (2013.01); *F01L 1/267* (2013.01); *F01L 13/0005* (2013.01);
(Continued)

(58) Field of Classification Search
CPC ............. F02D 13/0257; F02D 13/0261; F02D 13/0215; F01L 1/34; F01L 9/04; F02B 13/04
(Continued)

(56) References Cited

U.S. PATENT DOCUMENTS 5,211,146 A    5/1993    Pischinger
5,915,358 A    6/1999    Muller
(Continued)

FOREIGN PATENT DOCUMENTS

EP    0470869 A1    2/1992
FR    2877054 A1    4/2006
(Continued)

OTHER PUBLICATIONS

Espacenet, English Machine Translation of Abstract for EP0470869A1, published on Feb. 12, 1992, retrieved from http://worldwide.espacenet.com on Feb. 4, 2015 (2 pages).
(Continued)

*Primary Examiner* — Syed O Hasan
(74) *Attorney, Agent, or Firm* — Wood Herron & Evans LLP

(57) ABSTRACT

A valve control system is provided for an internal combustion engine, the engine having at least one cylinder with at least one set of at least two valves. All the valves in the set are either inlet valves or exhaust valves, and the system is configured to selectively operate the set of valves in a single valve mode of operation during which only one valve of the set is open at any time.

10 Claims, 3 Drawing Sheets

(51) Int. Cl.
*F01L 13/00* (2006.01)
*F02D 41/00* (2006.01)
F01L 9/02 (2006.01)
F01L 9/04 (2006.01)

(52) U.S. Cl.
CPC ..... *F02D 13/0261* (2013.01); *F02D 13/0273* (2013.01); *F02D 41/0002* (2013.01); *F01L 9/02* (2013.01); *F01L 9/04* (2013.01); *F02D 2041/001* (2013.01); *Y02T 10/18* (2013.01); *Y02T 10/42* (2013.01)

(58) Field of Classification Search
USPC .................. 123/90.1, 90.11, 90.15, 90.4
See application file for complete search history.

(56) References Cited

U.S. PATENT DOCUMENTS

| | | | | |
|---|---|---|---|---|
| 6,405,706 | B1* | 6/2002 | Hammoud | F01L 9/04 |
| | | | | 123/316 |
| 6,557,518 | B1* | 5/2003 | Albertson | F01L 13/0005 |
| | | | | 123/198 F |
| 6,701,887 | B2* | 3/2004 | Salber | F01L 9/04 |
| | | | | 123/315 |
| 6,705,261 | B2* | 3/2004 | Haghgooie | F01L 9/04 |
| | | | | 123/90.1 |
| 8,156,921 | B2* | 4/2012 | Meacock | F01L 1/18 |
| | | | | 123/321 |
| 2002/0066434 | A1* | 6/2002 | Hammoud | F01L 9/02 |
| | | | | 123/308 |
| 2002/0134348 | A1 | 9/2002 | Salber et al. | |
| 2003/0047163 | A1 | 3/2003 | Haghgooie et al. | |
| 2005/0205028 | A1 | 9/2005 | Lewis et al. | |
| 2009/0090318 | A1 | 4/2009 | Gibson et al. | |

FOREIGN PATENT DOCUMENTS

| | | |
|---|---|---|
| JP | 03114508 U | 11/1991 |
| JP | 3114508 U | 11/1991 |
| JP | 10184403 A | 7/1998 |
| JP | 2001115864 A | 4/2001 |
| JP | 2001159322 A | 6/2001 |

OTHER PUBLICATIONS

Espacenet, English Machine Translation of FR2877054A1, published on Apr. 28, 2006, retrieved from http://worldwide.espacenet.com on Feb. 4, 2015 (7 pages).

Intellectual Property Office of the United Kingdom, Patents Act 1977, Combined Search and Examination Report Under Sections 17 & 18(3), Application No. GB1217095.7, dated Jan. 9, 2013 (1 page).

European Patent Office, International Search Report and Written Opinion of the International Searching Authority, International Application No. PCT/GB2013/052486, dated Dec. 12, 2013 (8 pages).

* cited by examiner

VALVE CONTROL SYSTEMS FOR INTERNAL COMBUSTION ENGINES AND METHODS OF OPERATION THEREOF

CROSS-REFERENCE TO RELATED APPLICATIONS

This application is a submission under 35 U.S.C. § 371 of International Application No. PCT/GB2013/052486, filed Sep. 23, 2013, which claims priority to Great Britain Application No. 1217095.7, filed Sep. 25, 2012, the disclosures of which are hereby expressly incorporated by reference herein in their entireties.

FIELD OF THE INVENTION

The present invention relates to a valve control system for an internal combustion engine, the engine having cylinders with at least two inlet valves and/or at least two exhaust valves. More particularly, it is concerned with improving the efficiency and lifetime of an engine having valves which can be actuated independently of rotation of the engine crankshaft.

BACKGROUND OF THE INVENTION

It is well-known to operate inlet and exhaust valves of an internal combustion engine by means of a rotating camshaft. In many older designs of engine, the rotation of the cam shaft is mechanically coupled to that of the crankshaft and it is not possible to alter valve timing in relation to engine speed or loading. However, greater efficiency can be achieved by varying the valve operation with regard to the demands on the engine.

In order to give greater control over the valve actuation, it has been proposed to operate the valves using electro-magnetic solenoid actuators governed by a computer-controlled engine management system. An alternative approach is described in WO 2004/097184. This relates to an electromagnetic actuator having a driven rotor which is coupled to the valve by a suitable linkage.

SUMMARY OF THE INVENTION

The present invention provides a valve control system for an internal combustion engine, the engine having at least one cylinder with at least one set of at least two valves, with all the valves in the set being either inlet valves or exhaust valves, wherein the system is configured to selectively operate the set of valves in a single valve mode of operation during which only one valve of the set is open at any time.

Thus, during a period of single valve mode operation, only either one of the two valves in the set is open at any one time, or the other of the valves is open at any one time, if the set has only two valves.

It has been determined that over a considerable portion of the operating speed and load ranges of a combustion engine, it is sufficient to open only a single inlet valve and/or exhaust valve in multi-valve cylinders, leading to, for example, reduced parasitic losses and higher inlet gas velocities which can improve mixture preparation in the case of spark ignition engines.

Preferably, the system is configured to actuate the valves in the set in a sequence during the single valve mode of operation, or successive periods of single valve mode of operation.

Preferably, the system is configured to actuate only one of the valves in the course of the whole of any stroke of the engine during the single valve mode.

Preferably, the system is configured to actuate each valve of the set in turn during the single valve mode of operation.

Thus, for example, where the set has two valves, the system may be configured to actuate the valves in an alternating sequence.

As a result, the mechanical wear is shared substantially equally between the valves. Also, such an approach has a number of advantages over operating the same valve of a set of inlet valves or the same valve of a set of exhaust valves during a single valve mode of operation. In the case of inlet valves in port injected engines, it avoids the accumulation of fuel behind the head of a stationary valve, which may be particularly beneficial in terms of emissions quality. In addition, as the valve function is shared between the available valves and the period between each individual valve actuation cycle is doubled, the thermal load on an individual valve is dramatically reduced. In the case of electromagnetically operated systems, the actuator component temperatures will be reduced, and the energy consumption will be reduced as the electrical resistance of the windings will be decreased at lower temperatures. The thermal duty cycle is not merely shared but reduced in absolute terms.

For exhaust valves, the thermal advantage extends also to the valves themselves. They are typically the hottest components in the combustion chamber and operating each valve in turn more than doubles the ratio of the time spent cooling as heat is transferred to the valve seat (which is the principal cooling path for exhaust valves) to the time when high velocity exhaust gas is transferring heat into the valve.

This is of particular advantage in spark ignition engines, in which the temperature of the hottest surfaces inside a working cylinder of the engine has a bearing on how close the ignition timing can be to a theoretical ideal. Typically, the ignition timing is advanced so that the spark is generated at a point during the compression stroke, before the piston reaches top dead centre. Ideally, the timing pattern will vary as a function of engine speed and load and is determined, during calibration, by starting from a "late" (retarded) timing and advancing it until the best performance is achieved, which will also give the best fuel consumption. Further advance of the timing of the spark beyond the ideal timing would cause the cylinder pressure to become too high too soon before top dead centre is reached. This would mean that more work would then have to be done on the piston than is gained by the higher cylinder pressures after top dead centre. In modern engines using the standard fuels available today, there are significant areas of the speed: load map where this ideal timing cannot be achieved, because the increase in pressure, associated with the ideal timing, caused by the burning fuel-air mix would be sufficient to cause uncontrolled detonation of unburnt fuel/air before normal combustion is complete. This results in the phenomenon commonly known as pinking, detonation or knocking. This phenomenon can occur before the optimum advance (from the retarded position) for the spark timing is reached. In practice, this means that the ignition timing is normally set at a less than optimum advance, typically 3° retarded from the "detonation borderline" timing over at least a proportion of the speed: load map. Modern engine management systems use knock sensors and adaptive control techniques to maintain ignition timing at the most advanced achievable setting.

It has been realised that the exhaust valve temperature is an influential parameter in determining the susceptibility of the engine to knocking, and reducing the exhaust valve temperature therefore enables the ignition to be further advanced, closer to its optimum timing. Indeed, reducing the exhaust valve temperature has a disproportionate effect because, in accordance with Stefan's Law, the amount of radiated heat from the valve will be proportional to the fourth power of its absolute temperature.

It is believed that the activation of the exhaust valves in turn may enable the ignition timing in a spark ignition engine to be capable of being advanced further than would be the case if both or all of the exhaust valves were activated simultaneously.

During the single valve mode of operation, each valve of a set may carry out a single actuation cycle in turn, or a plurality of actuation cycles in turn.

Carrying out a plurality of the valve actuation cycles in turn (e.g., operating only a first valve for a plurality of engine cycles and then only a second valve for a subsequent plurality of cycles) has a number of potential advantages compared with carrying out a single actuation cycle in turn.

Firstly, when this approach is used for inlet valves of port injected engines, carrying out multiple actuation cycles in turn means that there is less transient inlet port wall film fuel compensation required to re-establish the optimal air/fuel conditions in the port for the subsequent induction cycle of the engine. In the single actuation case, extra fuel would be required to re-establish the wall film on every other cycle of the engine. Secondly, the respective actuator for each vale needs to undergo start-up/shut-down processes at a lower frequency for the multiple actuation cycle approach. This results in the start-up/shut down mechanical and electrical power losses (which are especially relevant for electromagnetic actuators) with the multiple actuation approach to be spread over several cycles instead of being lost over a single cycle, so proportionally the energy losses are less with multiple cycle switching than with single cycle switching. This advantage applies whether the valves of the set are inlet valves or exhaust valves.

Furthermore, where each valve (during single valve mode) is actuated plural times before the other valve is actuated, thermal losses in starting and stopping are reduced in that the temperature fluctuations associated with the multiple cycle switching are less rapid than is the case with the single cycle switching of exhaust and/or inlet valves.

A further potential advantage of the multiple actuation cycle feature is that, when applied to the inlet valves, there will be fewer transient inlet port pressure wave effects which may disrupt the stable operation of the port fuelling system and control strategies.

According to another embodiment, the valve control system is configured to operate the set of valves for a period of the single valve mode of operation until a different mode of operation is required or the engine is stopped, and to use one valve of the set of valves for one period of the single valve mode of operation and another valve of the set of valves for the next period of the single valve mode of operation. In this way, over time, all the valves will experience substantially the same duty cycle on average. Thus, both the mechanical wear and the thermal duty cycle on the valve trains will be shared between them. It is also believed that this approach can give the best ignition performance (i.e., the closet to ideal ignition timing), when applied to the exhaust valves.

The present invention also provides a method of operating a valve control system for an internal combustion engine, the engine having at least one cylinder with at least one set of at least two valves, with all the valves in the set being either inlet valves or exhaust valves, the method comprising a step of actuating the set of valves with the system in a single valve mode of operation during which only one valve of the set is open at any time.

The valve control system may comprise an electrical controller arranged to output control signals for controlling actuators mechanically coupled to respective valves.

It will be appreciated that the present concept is applicable to engines having valves which are operable independently of rotation of the engine crankshaft. The valve actuators may operate electromagnetically, hydraulically and/or pneumatically. Thus, the term "actuator" is intended to encompass any electromagnetic, pneumatic or hydraulic device producing a force or a torque for operating an associated valve. During an "actuation cycle", a valve stem moves away from its initial starting position and then returns to that position.

BRIEF DESCRIPTION OF THE DRAWINGS

Embodiments of the present invention will now be described, by way of example only, with reference to the accompanying schematic drawings, wherein.

DETAILED DESCRIPTION OF THE INVENTION

Figure 1:
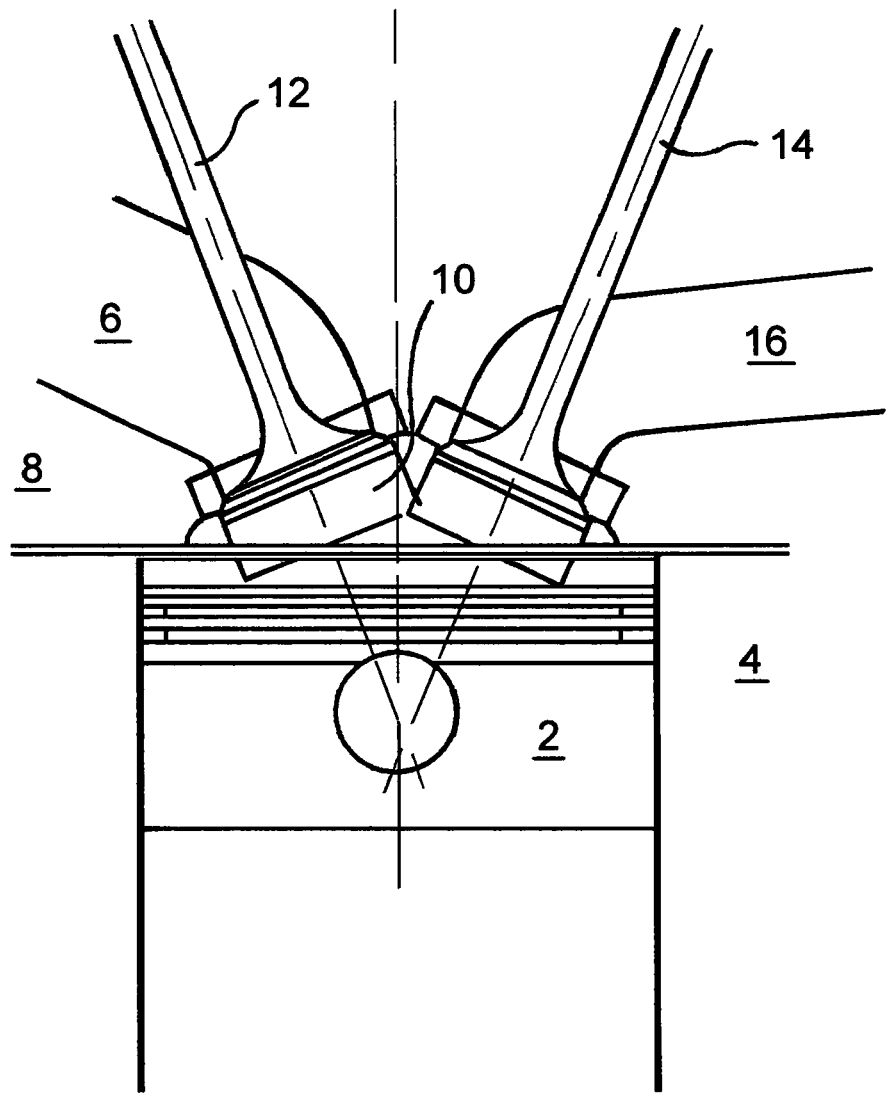
FIG. 1 is a cross-sectional side view of the upper portion of a cylinder in a known internal combustion engine.

FIG. 1 shows a cross-sectional view of a cylinder of a well-known internal combustion engine configuration. A piston 2 is arranged to reciprocate up and down within a cylinder block 4. The flow of charge air (or an air and fuel mixture, depending on the engine configuration) from an inlet port 6 within the cylinder head 8 into the combustion chamber 10 is controlled using inlet poppet valve 12. Exhaust poppet valve 14 allows exhaust gases to escape from the combustion chamber after combustion has taken place, with the exhaust gases being carried away via exhaust port 16.

Only a single inlet valve and a single exhaust valve are shown in FIG. 1. In a multi-valve engine, each cylinder has more than two valves. That is, it has a set of at least two inlet valves and/or a set of at least two exhaust valves, leading to improved performance. Various configurations have been developed. These include a three-valve cylinder head, having a single large exhaust valve and two smaller inlet valves. A four-valve cylinder head is more common, having two inlet valves and two exhaust valves. Five-valve cylinder heads have been developed having two exhaust valves and three inlet valves. It will be appreciated that the present invention is applicable to other multi-valve configurations.

Figure 2:
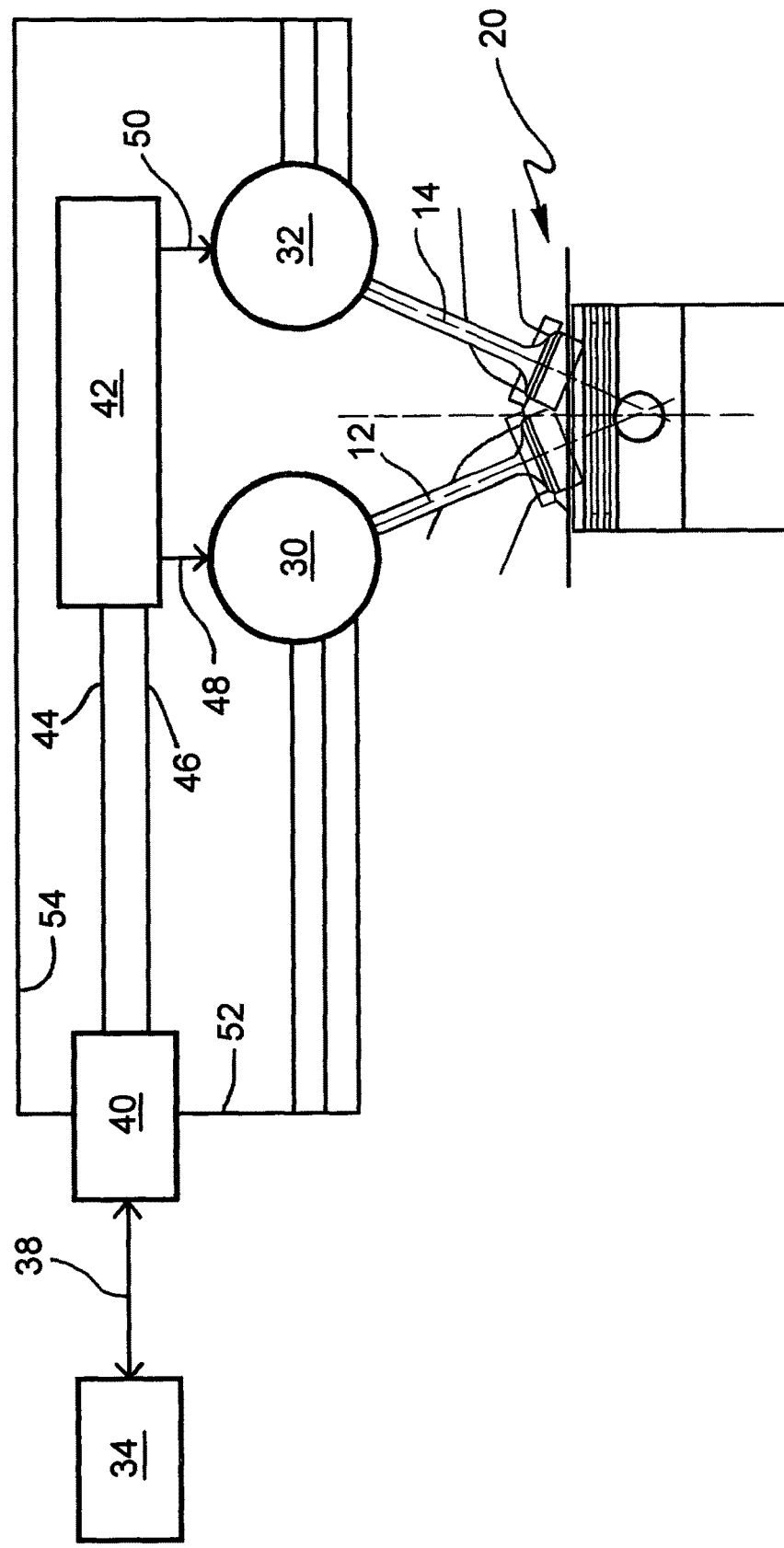
FIG. 2 is a block diagram of an engine control system including a valve control system embodying the present invention, and also part of a cylinder head of an engine having valves which are controlled by the system.

FIG. 2 shows an engine control system including at least one valve control system embodying the present invention. Cylinder head 20 has a multi-valve configuration (although only a single inlet valve 12 and a single exhaust valve 14 are shown in the Figure), two inlet valves and two exhaust valves, each of which opens and closes a respective inlet and outlet port in the cylinder head.

Figure 3:
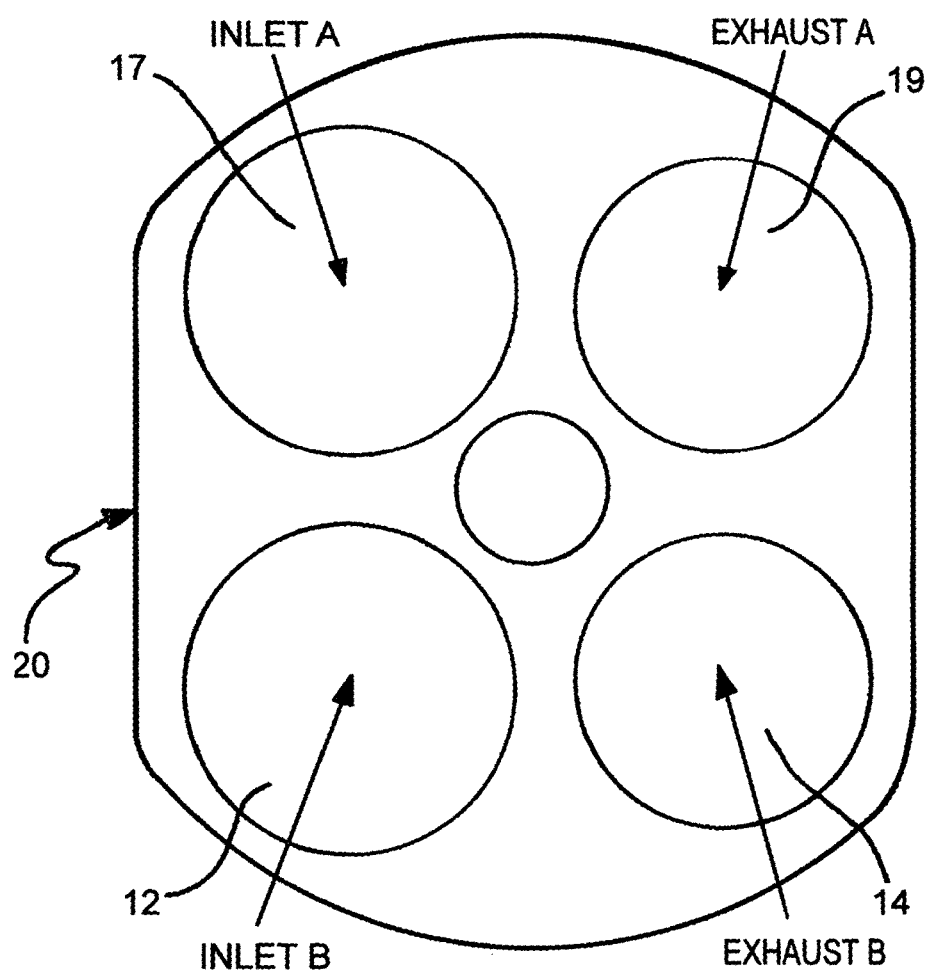
FIG. 3 is a diagrammatic view of the underside of the cylinder head, showing two inlet valves and two outlet valves.

In FIG. 3, the cylinder head is shown in order to illustrate the positions of all four valves, the valve heads of which are visible in the Figure. The second inlet valve 17 opens and closes a second inlet port, and a second exhaust valve 19 opens and closes a second exhaust port. It will be appreciated that the pair of inlet and the pair of outlet valves each constitutes a respective set each of two valves. Although the present invention is described in relation to a single cylinder engine, the cylinder head may be configured for an engine having a plurality of cylinders, each associated with a respective set of two inlet valves and a respective set of two exhaust valves. Thus, for example, a four cylinder engine will have a total of sixteen inlet/exhaust valves.

In this example, both the inlet valves and the exhaust valves are individually electronically controllable, independently of the rotation of the engine crankshaft. The present invention would also be applicable to configurations in which only one of (a) the set of exhaust valves and (b) the set of inlet valves is controllable independently of the rotation of the engine crankshaft. Each valve is operated by a respective actuator. Thus, an actuator 30 is provided to operate inlet valve 12 and an actuator 32 operates exhaust valve 14. Each actuator may, for example, be of the kind shown in WO 2004/097184.

The overall operation of the engine is governed by an engine control unit 34. A bi-directional communication link 38 is provided between the engine control unit 34 and a valve control unit 40. In practice, control units 34 and 40 may be physically separate units or integrated into a single controller. Valve control unit 40, together with an actuator power electronics module 42 and the actuators 30 and 32, form a valve control system controlling the operation of the sets of inlet and exhaust valves.

Having regard to control signals from the engine control unit, the valve control unit in turn generates inlet actuator and exhaust actuator drive signals 44, 46 which are sent to the actuator power electronics module 42. In response to these signals, module 42 generates inlet actuator and exhaust actuator drive currents along respective conductive lines 48 and 50. To enable the operation of the actuators to be responsive to changes in their operating conditions, feedback signals 52 and 54 are communicated to the valve control unit from the inlet valve and exhaust valve actuators, respectively. These feedback signals may provide information relating to one or more operating conditions of the respective valve actuator, such as its position, the temperature of electromagnetic windings, current flow in the windings, or any other parameter which may affect the relationship between the control signal fed to the actuator and the resultant change in the position of the valve that it operates. The information conveyed by these signals may of course vary depending on the type of actuation employed, whether electromagnetic, hydraulic or pneumatic, for example. It is used to calibrate the operation of the actuators during the first firing cycle of the cylinder and as adaptive input to the control system during normal operation.

The valve control unit is able to operate the valves according to a number of different modes of operation, including a multi-valve mode of operation in which all the valves in the set of inlet valves are on duty simultaneously and all the valves in the set of exhaust valves are on duty simultaneously. In the multi-valve mode of operation, both of the inlet valves associated with the cylinder head are thus actuated (i.e., opened and closed) simultaneously, as are both of the exhaust valves. In an engine having more than one cylinder, the timing of the opening and closing of the inlet and exhaust valves will be governed by the phase of the associated piston, but in this case the inlet valves for each cylinder will both be opened during the associated piston's intake stroke, whilst the exhaust valves will both be open during the exhaust stroke. The valve control unit can also operate the valves according to a single valve mode of operation, in which only one inlet or exhaust valve is open at any one time, depending upon the phase of the associated piston in the engine's operating cycle.

In the example of a cylinder head having two inlet valves and two exhaust valves, operation, during the single valve mode, is alternated between each of the two inlet valves and between each of the two exhaust valves. This alternation may occur between the valves during single valve operation mode on a cycle-by-cycle basis, with one of the inlet valves being actuated during one intake stroke and the other being actuated during the next intake stroke, with one exhaust valve being actuated during one exhaust stroke and the other during the next exhaust stroke, and so on. Alternatively, two or more cycles may be carried out by each valve before switching to the other. With reference to FIG. 3, the inlet and outlet valves are labelled A and B to help to illustrate possible operating sequences. With alternating actuation, the inlet and exhaust valves of each set are actuated in the following sequence: A-B-A-B-A-B, etc., whilst a single valve mode of operation in which an inlet or exhaust valve undergoes a number of actuation cycles before a switch is made to the other inlet/exhaust valve could provide a sequence A-A-A-A-B-B-B-B-A-A-A-A, etc.

In a further approach, one inlet valve only is run for consecutive cycles until there is a demand for multi-valve operation or the engine is stopped. As soon as single valve operation is again required, the single valve operation mode is resumed using the other inlet valve.

Corresponding options are equally applicable to operation of the exhaust valves.

The system can be configured, for multi-cylinder engines, to operate different cylinders in different modes or to operate the engine in a variable displacement mode, in which some cylinders are deactivated and their valves maintained in a closed position. In addition, it is possible for the single valve mode of operation to be used only on one set of valves (for example, the inlet valves), whilst the other set of valves (for example, the exhaust valves) are operated in dual mode, in which the valves in said other set are both actuated during each cycle of the engine (for example, being opened and closed simultaneously).

While the present invention has been illustrated by description of various embodiments and while those embodiments have been described in considerable detail, it is not the intention of Applicant to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicants' invention.

What is claimed is:

1. A valve control system for a multi-cylinder internal combustion engine having a crankshaft, the internal combustion engine having at least one cylinder with at least one set of at least two valves, with all the valves in the at least one set of at least two valves being either inlet valves or exhaust valves, the valve control system comprising a respective valve actuator for actuating each valve of the at least one set of at least two valves independently of the rotation of the crankshaft of the internal combustion engine to cause the valve to undergo a valve actuation cycle in which the valve stem moves away from an initial starting position and then returns to that position, the valve control system also having a controller for controlling the respective valve actuators, the controller being arranged or configured to selectively operate the at least one set of at least two valves in a multi-valve mode of operation in which all of the valves in the at least one set of at least two valves are actuated simultaneously and in a single valve mode of operation during which only one valve of the at least one set of at least two valves is open at any time, wherein the controller is arranged or configured to actuate the valves in the at least one set of at least two valves in a sequence, during the single valve mode of operation, or over successive periods of single valve mode operation, and wherein in accordance with the sequence, the controller is arranged or configured to cause each valve of the at least one set of at least two valves to be controlled by the valve control system to carry out a plurality of successive valve actuation cycles in turn, during said single valve mode of operation or over successive periods of single valve mode operation, the valve control system being configured, for a multi-cylinder internal combustion engine, to operate different cylinders of the multi-cylinder internal combustion engine in different modes, each being a respective one of the multi-valve and single valve modes.

2. The valve control system according to claim 1, in which the valve control system is configured to actuate said only one valve in the course of the whole of a stroke of the engine, during the single valve mode.

3. The valve control system according to claim 1, in which the valves in the at least one set of at least two valves are exhaust valves.

4. The valve control system of claim 1, wherein the valve control system is configured to operate the at least one set of at least two valves for a period of the single valve mode of operation until a different mode of operation is required or the internal combustion engine is stopped, and to use one valve of the at least one set of at least two valves which is controlled to carry out a plurality of actuation cycles for one period of the single valve mode of operation and another valve of the at least one set of at least two valves which is controlled to carry out a plurality of actuation cycles for the next period of the single valve mode of operation.

5. An internal combustion engine including a valve control system of claim 1, and at least one cylinder with at least one set of at least two' valves, with all the valves in the at least one set of at least two valves being either inlet valves or exhaust valves.

6. A method of operating a valve control system for a multi-cylinder internal combustion engine, the internal combustion engine having at least one cylinder with at least one set of at least two valves, with all the valves in the at least one set of at least two valves being either inlet valves or exhaust valves, the valve control system comprising a respective valve actuator for actuating each valve of the at least one set of at least two valves and a controller for controlling the respective valve actuators, the method comprising a step of selectively actuating the at least one set of at least two valves with the valve control system in a single valve mode of operation during which only one valve of the at least one set of at least two valves is open at any time, or in a multi-valve mode of operation in which all the valves in the set are on duty simultaneously wherein the valves in the at least one set of at least two valves are actuated in a sequence during the single valve mode of operation or successive periods of single valve mode operation, and wherein in accordance with the sequence the controller is arranged or configured to cause each valve of the at least one set of at least two valves to carry out a plurality of actuation cycles in turn, during said single valve mode of operation, the valve control system being configured, for multi-cylinder internal combustion engines, to operate different cylinders of the multi-cylinder internal combustion engine in different modes of operation, each mode being a respective one of the multi-valve and single valve modes.

7. The method of claim 6, wherein each valve of the at least one set of at least two valves is actuated in turn during the single valve mode of operation.

8. The method of claim 6, comprising the steps of:

operating one valve of the at least one set of at least two valves for a period of the single valve mode of operation until a different mode of operation is required or the internal combustion engine is stopped; and operating another valve of the at least one set of at least two valves for the next period of the single valve mode of operation.

9. The valve control system according to claim 1, in which the controller is arranged or configured to cause each valve of the at least one set of at least two valves to be controlled by the valve control system to carry out a plurality of successive valve cycles in turn, during said single valve mode of operation or over successive periods of single valve mode operation independent of load or speed conditions of the internal combustion engine.

10. The method of claim 6, wherein the controller is arranged or configured to cause each valve of the at least one set of at least two valves to carry out a plurality of actuation cycles in turn, during said single mode independent of load or speed conditions of the internal combustion engine.

* * * * *